(12) United States Patent
Turner et al.

(10) Patent No.: US 6,968,921 B2
(45) Date of Patent: Nov. 29, 2005

(54) ROLL-OVER CONTROLLER

(75) Inventors: Marcus Turner, Conventry (GB); Ian Hulme, Leamington Spa (GB)

(73) Assignee: Ford Global Technologies LLC, Dearborn, MI (US)

( * ) Notice: Subject to any disclaimer, the term of this patent is extended or adjusted under 35 U.S.C. 154(b) by 0 days.

(21) Appl. No.: 10/694,372

(22) Filed: Oct. 27, 2003

(65) Prior Publication Data

US 2005/0087389 A1 Apr. 28, 2005

(51) Int. Cl.$^7$ ................................................. B62D 5/04
(52) U.S. Cl. ..................... 180/446; 180/422; 280/5.51; 701/38; 701/41; 701/48
(58) Field of Search ............................. 701/38, 41, 48; 180/422, 443, 446, 282; 280/756, 5.51

(56) References Cited

U.S. PATENT DOCUMENTS

| | | | |
|---|---|---|---|
| 4,386,674 A | 6/1983 | Sugata | |
| 4,480,714 A | 11/1984 | Yabuta et al. | |
| 4,954,957 A | 9/1990 | Kawagoe et al. | |
| 5,684,700 A | 11/1997 | Crocker | |
| 6,002,974 A | 12/1999 | Schiffmann | |
| 6,002,975 A | 12/1999 | Schiffmann et al. | |
| 6,081,761 A | 6/2000 | Harada et al. | |
| 6,087,761 A | 7/2000 | Lorraine et al. | |
| 6,141,604 A | 10/2000 | Mattes et al. | |
| 6,496,758 B2 * | 12/2002 | Rhode et al. | 701/41 |
| 6,529,803 B2 * | 3/2003 | Meyers et al. | 701/38 |
| 6,654,674 B2 * | 11/2003 | Lu et al. | 701/41 |
| 6,662,898 B1 * | 12/2003 | Mattson et al. | 180/446 |

FOREIGN PATENT DOCUMENTS

WO    WO 9964262    12/1999

* cited by examiner

*Primary Examiner*—Lesley D. Morris
*Assistant Examiner*—Matthew Luby
(74) *Attorney, Agent, or Firm*—Frank A. MacKenzie; Artz & Artz

(57) ABSTRACT

A steering system for a vehicle includes at least one wheel that pivots to define a steering angle, wherein the steering angle is defined, at least in part, by an input from the operator, and at least one sensor adapted to monitor the roll of a vehicle body and a height of the center of gravity of the vehicle. The steering system also includes a motor operatively connected to the wheel that supplements the input to the steering angle, and a controller in communication with the sensor and operatively connected to the motor, wherein the controller is adapted to adjust the supplementation of the input to the steering angle based upon the amount of roll of the vehicle body as monitored by the sensor, and adapted to supplement the steering angle when the amount of roll of the vehicle body as monitored by the sensor exceeds a maximum value.

20 Claims, 2 Drawing Sheets

STEERING WHEEL ANGLE FOR
GIVEN WHEEL BUMP POSITION

ROLL-OVER CONTROLLER

BACKGROUND OF THE INVENTION

The present invention relates to a vehicle steering system, and in particular to a method and apparatus for reducing the chance of roll-over of a motor vehicle by assisting a driver in steering the motor vehicle.

Numerous safety systems have been incorporated within motor vehicles for deploying safety devices in the vehicle if an imminent rollover of the vehicle is detected. These systems typically include extendable roll cages, devices for removing any slack within the safety restraints of the associated vehicle, airbag deployment devices within the vehicle, etc. While these devices increase the overall safety of the vehicle, they do not help eliminate the ultimate roll-over of the vehicle.

Other systems that have been designed to reduce the possibility of vehicle roll-over are not adapted to take dynamic factors into account. These "static" systems are typically programmed to react to a particular set of circumstances and cannot take parameters such as vehicle loading, velocity of the vehicle and vehicle suspension deflection into account. These systems are useful in some situations, however, lack the flexibility to provide the operator with the maximum vehicle performance in dynamic situations.

Accordingly, there is a need for a safety system that reduces the possibility of vehicle roll-over while maximizing the steering efficiency of the associated vehicle.

SUMMARY OF THE INVENTION

One aspect of the present invention is to provide a steering system for a vehicle that includes at least one wheel that pivots to define a steering angle, wherein the steering angle is defined, at least in part, by an input from the operator, and at least one sensor adapted to monitor the roll of a vehicle body and a height of the center of gravity of the vehicle from a given point. The steering system also includes a motor operatively connected to the wheel that supplements the input to the steering angle from the operator, and a controller in operable communication with the sensor and operatively connected to the motor, wherein the controller is adapted to adjust the supplementation of the input of the steering angle from the operator based upon the amount of roll of the vehicle body as monitored by the sensor, and adapted to supplement the steering angle when the amount of roll of the vehicle body as monitored by the sensor exceeds a calculated maximum value, thereby reducing the amount of roll of the vehicle body.

Another aspect of the present invention is to provide a method of controlling roll-over of a motor vehicle that includes monitoring an actual amount of roll of a vehicle body, monitoring a height of the center of gravity of the vehicle and determining a maximum roll value based, at least in part, on the height of the center of gravity of the vehicle. The method also includes comparing the actual amount of roll of the vehicle body to the maximum roll value, and controlling a steering angle of a steerable wheel of the vehicle based on the comparison of the actual amount of roll of the vehicle body to the maximum roll value.

Yet another aspect of the present invention is to provide a method of controlling roll-over of a motor vehicle that comprises the steps of determining an actual amount of a roll of a vehicle body by measuring the relative difference between the deflection of a suspension between two sides of the vehicle, and determining a height of the center of gravity of the vehicle by monitoring the weight of the vehicle by measuring the relative height of the suspension of the vehicle relative to a given point. The method also includes determining a maximum roll value based, at least in part on the height of the center of gravity of the vehicle, and comparing the actual amount of roll of the vehicle body to the maximum roll value. The method further includes controlling a steering angle of a steerable wheel of the vehicle based on the comparison of the actual amount of the roll of the vehicle body to the maximum roll value, thereby reducing the actual amount of roll of the vehicle body.

The present inventive vehicle steering system reduces the chance of roll-over of the associated motor vehicle by assisting the operator in steering the motor vehicle in extreme conditions, allows the operator to maintain control of the. associated vehicle, and is particularly well-adapted for the proposed use.

These and other advantages of the invention will be further understood and appreciated by those skilled in the art by reference to the following written specification, claims, and appended drawings.

DETAILED DESCRIPTION OF PREFERRED EMBODIMENTS

Figure 1:
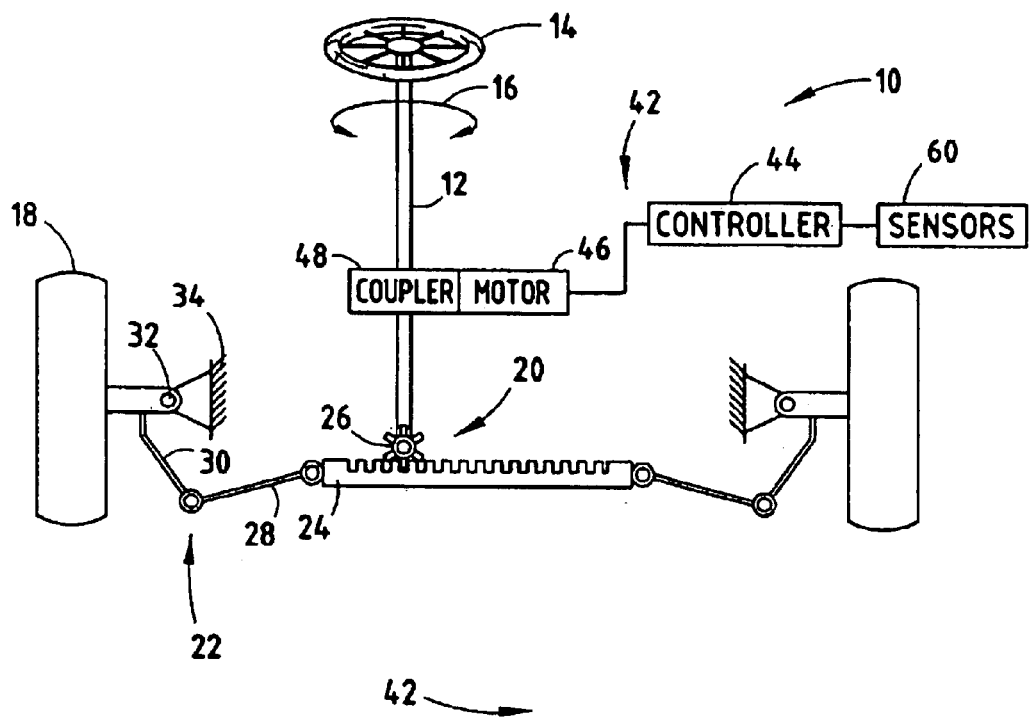
FIG. 1 is a partially schematic view of a steering system embodying the present invention, wherein the steering angle is 0°.
Figure 4:
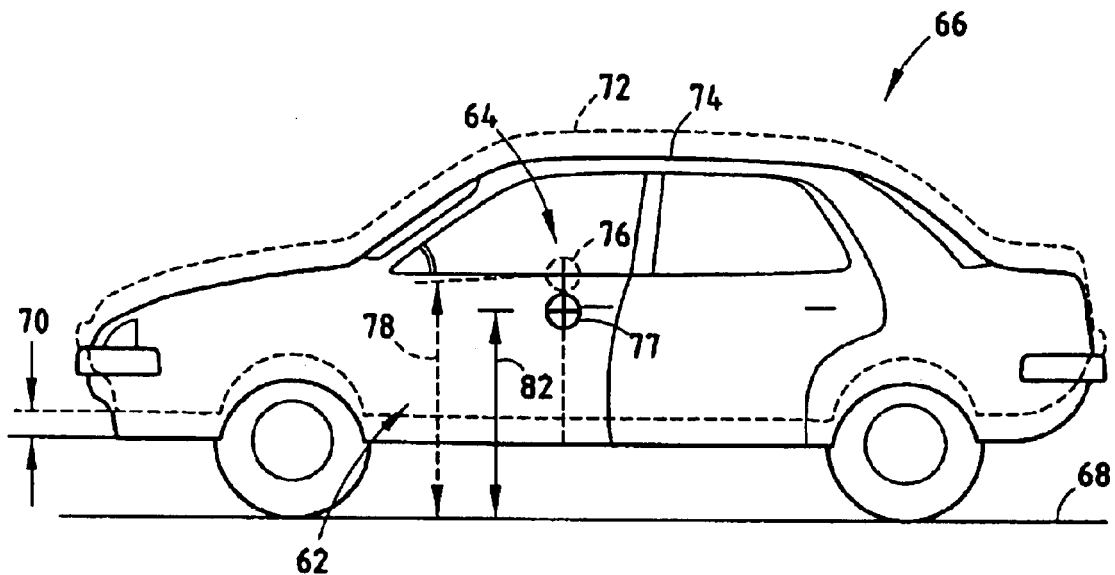
FIG. 4 is a side elevational view of a motor vehicle depicting alternative locations for an associated center of gravity.

For purposes of description herein, the terms "upper," "lower," "right," "left," "rear," "front," "vertical," "horizontal," and derivatives thereof shall relate to the invention as oriented in FIGS. 1 and 4. However, it is to be understood that the invention may assume various alternative orientations and step sequences, except where expressly specified to the contrary. It is also to be understood that the specific devices and processes illustrated in the attached drawings, and described in the following specification are exemplary embodiments of the inventive concepts defined in the appended claims. Hence, specific dimensions and other physical characteristics relating to the embodiments disclosed herein are not to be considered as limiting, unless the claims expressly state otherwise.

The Reference 10 (FIG. 1) generally designates a vehicle steering system embodying the present invention. In the illustrated example, steering system 10 includes a steering shaft 12 that is adapted to receive an input from an operator via a steering wheel 14 in a direction and as indicated by an arrow 16. Steering shaft 12 is operably coupled to a pair of steerable front wheels 18 via a rack-and-pinion system 20 and a plurality of steering links 22. Rack-and-pinion system 20 includes a rack 24 and a pinion gear 26. Steering links 22 include drag links 28 and steering arms 30. Although the present example utilizes a rack-and-pinion steering system and a particular assembly of linkages, it should be noted that other steering systems compatible with the inventive steering system 10 described herein may be substituted therefore.

Figure 2:
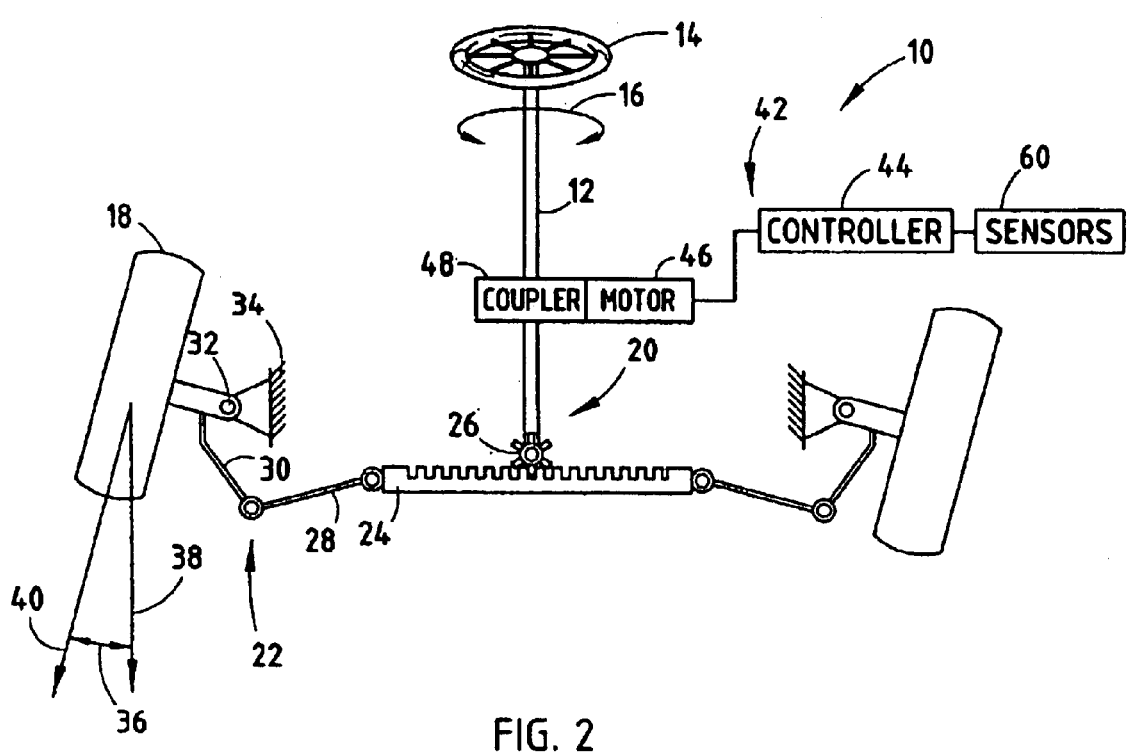
FIG. 2 is a partially schematic view of the steering system pivoted to a non-zero steering angle.

Each steerable wheel 18 (FIG. 2) pivots about a pivot point 32 with respect to a vehicle frame or body 34. Each wheel 18 defines a steering angle 36 between the longitudinal axis 38 of the associated vehicle and a central travel axis 40 of wheel 18. It should be noted that while steering angle 36 is defined by the pivotal movement of each of front wheels 18, a steering angle may be defined by pivotable rear wheels if the vehicle is so equipped and/or any other pivotable wheels.

Figure 3:
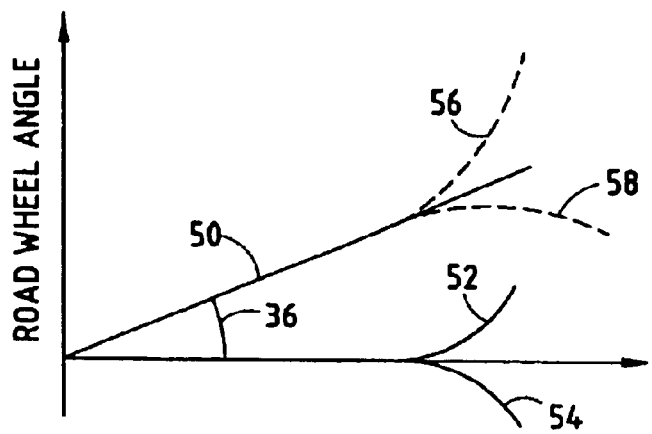
FIG. 3 is a diagram of steering angle versus steering wheel angle for the present inventive steering system.

The steering system 10 further includes an active front steering system 42 that includes a controller 44 in operable communication with a steering assist motor 46 operably connected to steering shaft 12 via a mechanical coupler 48. The active front steering system 42 assists in pivoting wheels 18 depending on various driving parameters as described below. Although a particular kind of active front steering system is illustrated in the examples herein, other systems known in the art may be utilized. In basic operation, active front steering system 42 positively and negatively supplements the input from the operator as applied to steering wheel 14, via steering assist motor 46. As illustrated in FIG. 3, the steering angle 36 as defined by each wheel 18 follows a particular ratio. Specifically, active front steering system 42 supplements the input from the operator, as represented by line 50, thereby adjusting steering angle 36 by increasing the steering angle, as illustrated by line 52, or by decreasing the steering angle 36, as illustrated by line 54. Lines 56 and 58 represent the combined effects of the operator input 50 with the positive supplementation 52 or negative supplementation 54, respectively, and indicate the total input into steering angle 36.

In operation, a plurality of sensors 60 are utilized to monitor the roll of an associated vehicle body of a vehicle 66 as caused by a side-slope thereof. Specifically, sensors 60 monitor a height 62 of the center of gravity 64 of vehicle 66. Although in the illustrated example height 62 is measured between center of gravity 64 and ground level 68, height 62 can be measured between center of gravity 64 and any set point. In the illustrated example, the height 62 of center of gravity 64 is determined by monitoring the weight of vehicle 66. The weight of vehicle 66 is determined by the change in the height 70 of the suspension of vehicle 66 that changes between an unloaded vehicle position 72 and a loaded vehicle position 74. In unloaded position 72, center of gravity 64 is located in a position 76 at a height 78 above ground level 68, while in loaded position 74, center of gravity 64 is located at a position at a height 82 above ground level 68, thereby changing the roll-over characteristics of vehicle 66. Controller 44 of active front steering system 42 calculates a maximum roll-over value determined from the height 62 of center of gravity 64 of vehicle 66. Sensors 60 further monitor the actual amount of roll of the vehicle body by monitoring the difference in suspension deflection 70 between each side of vehicle 66, and the lateral acceleration of vehicle 66 via a lateral accelerometer. By monitoring the parameters as discussed above, sensors 60 provide controller 44 with the information required to calculate both the maximum roll-over value of vehicle 66 for any given height 62 of the center of gravity 64, as well as the actual amount of roll of the body of vehicle 66 at any particular time. When an imminent roll-over situation is detected, controller 44 of active front steering system 42 directs steering assist motor 46 to supplement the steering angle 36. As a particular example, in a situation in which vehicle 66 encounters a downward slope, active front steering system 42 may be utilized to direct vehicle 66 down the slope by augmenting steering angle 36, thereby preventing a rollover of vehicle 66.

The present inventive vehicle steering system reduces the chance of roll-over of the associated motor vehicle by assisting the operator in steering the motor vehicle in extreme conditions, allows the operator to maintain control of the associated vehicle, and is particularly well-adapted for the proposed use.

In the foregoing description, it will be readily appreciated with those skilled in the art that modifications may be made to the invention without departing from the concepts disclosed herein. Such modifications are to be considered as included in the following claims, unless these claims by their language expressly state otherwise.

What is claimed is:

1. A steering system for a vehicle, comprising:
   at least one wheel that pivots to define a steering angle, the steering angle defined, at least in part, by an input from an operator;
   at least one sensor adapted to monitor the roll of a vehicle body and a height of the center of gravity of the vehicle from a given point;
   a motor operatively connected to the wheel that supplements the input to the steering angle from the operator; and
   a controller in operable communication with the sensor and operatively connected to the motor, the controller adapted to adjust the supplementation of the input to the steering angle from the operator based upon the amount of roll of the vehicle body as monitored by the sensor, and adapted to supplement the steering angle when the amount of roll of the vehicle body as monitored by the sensor exceeds a calculated maximum value defined at least in part, by the height of the center of gravity of the vehicle, thereby reducing the amount of roll of the vehicle body.

2. The steering system of claim 1, wherein the at least one sensor is adapted to monitor the height of the center of gravity of the vehicle by monitoring a weight of the vehicle.

3. The steering system of claim 2, wherein the at least one sensor is adapted to monitor the weight of the vehicle by monitoring a relative height of the suspension from a given point.

4. The steering system of claim 3, wherein the at least one sensor includes a lateral accelerometer adapted to monitor the lateral acceleration of the vehicle.

5. The steering system of claim 4, wherein the at least one sensor is adapted to monitor a difference in suspension deflection between two sides of the vehicle, thereby monitoring the amount of roll of the vehicle.

6. The steering system of claim 5, wherein the at least one sensor is adapted to monitor longitudinal speed of the vehicle.

7. The steering system of claim 1, wherein the at least one sensor includes a lateral accelerometer adapted to monitor the lateral acceleration of the vehicle.

8. The steering system of claim 1, wherein the at least one sensor is adapted to monitor a difference in suspension deflection between two sides of the vehicle, thereby monitoring the amount of roll of the vehicle.

9. The steering system of claim 1, wherein the at least one sensor is adapted to monitor a longitudinal speed of the vehicle.

10. A method of controlling roll-over of a motor vehicle, comprising the steps of:
    monitoring an actual amount of roll of a vehicle body;
    monitoring a height of the center of gravity of the vehicle;
    determining a maximum roll value based, at least in part, on the height of the center of gravity of the vehicle;

comparing the actual amount of roll of the vehicle body to the maximum roll value; and controlling a steering angle of a steerable wheel of the vehicle based on the comparison of the actual amount of roll of the vehicle body to the maximum roll value.

11. The method of claim 10, wherein the step of monitoring the height of the center of gravity includes monitoring a weight of the vehicle.

12. The method of claim 11, wherein the step of monitoring the height of the center of gravity includes monitoring a relative height of the suspension from a given point.

13. The method of claim 12, wherein the step of monitoring the actual amount of roll includes monitoring the lateral acceleration of the vehicle with a lateral accelerometer.

14. The method of claim 13, wherein the step of monitoring the actual amount of roll includes monitoring the difference in suspension deflection between two sides of the vehicle.

15. The method of claim 14, wherein the step of determining the maximum roll value is based, at least in part, on a longitudinal speed of the vehicle.

16. The method of claim 10, wherein the step of monitoring the height of the center of gravity includes monitoring a relative height of the suspension from a given point.

17. The method of claim 10, wherein the step of monitoring the actual amount of roll includes monitoring the lateral acceleration of the vehicle.

18. The method of claim 10, wherein the step of monitoring the actual amount of roll includes monitoring the difference in suspension deflection between two sides of the vehicle.

19. The method of claim 10, wherein the step of determining the maximum roll value is based, at least in part, on a longitudinal speed of the vehicle.

20. A method of controlling roll-over of a motor vehicle, comprising the steps of:

determining an actual amount of roll of a vehicle body by measuring the relative difference between the deflection of a suspension between two sides of the vehicle;

determining a height of the center of gravity of the vehicle by monitoring the weight of the vehicle by measuring the relative height of the suspension of the vehicle relative to a given point;

determining a maximum roll value based, at least in part, on the height of the center of gravity of the vehicle;

comparing the actual amount of roll of the vehicle body to the maximum roll value; and controlling a steering angle of a steerable wheel of the vehicle based on the comparison of the actual amount of roll of the vehicle body to the maximum roll value, thereby reducing the actual amount of roll of the vehicle body.

* * * * *